(12) United States Patent
Nilsson et al.

(10) Patent No.: US 12,013,278 B2
(45) Date of Patent: Jun. 18, 2024

(54) RADAR LEVEL GAUGE SYSTEM AND METHOD FOR CONTROLLING THE RADAR LEVEL GAUGE SYSTEM

(71) Applicant: Rosemount Tank Radar AB, Mölnlycke (SE)

(72) Inventors: Leif Nilsson, Linköping (SE); Håkan Samor, Borensberg (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 394 days.

(21) Appl. No.: 17/439,088

(22) PCT Filed: Apr. 24, 2019

(86) PCT No.: PCT/EP2019/060531
§ 371 (c)(1),
(2) Date: Sep. 14, 2021

(87) PCT Pub. No.: WO2020/216443
PCT Pub. Date: Oct. 29, 2020

(65) Prior Publication Data
US 2022/0155129 A1 May 19, 2022

(51) Int. Cl.
*G01F 23/284* (2006.01)
*G01F 23/80* (2022.01)
*G01S 13/88* (2006.01)

(52) U.S. Cl.
CPC .......... *G01F 23/284* (2013.01); *G01F 23/802* (2022.01); *G01S 13/88* (2013.01)

(58) Field of Classification Search
CPC ...... G01F 23/284; G01F 23/802; G01S 13/88; G01S 7/032; H02J 3/14; H02J 7/0068; H02J 7/04; H02J 50/80
(Continued)

(56) References Cited

U.S. PATENT DOCUMENTS 6,662,649 B1 * 12/2003 Knight .................. G01F 23/802
250/357.1
6,961,665 B2 * 11/2005 Slezak .................. G01F 23/284
702/143
(Continued)

OTHER PUBLICATIONS

International Search Report and Written Opinion from PCT/EP2019/060531, dated Jan. 27, 2020.

*Primary Examiner* — Ladimir Magloire
*Assistant Examiner* — Michael W Justice
(74) *Attorney, Agent, or Firm* — Westman, Champlin & Koehler, P.A.

(57) ABSTRACT

Radar level gauge system comprising: a communication module configured to be connected to an external communication device; a measurement module configured to generate, transmit and receive a measurement signal; a control connection configured to connect the communication module to the measurement module, the control connection being configured to be in a high-impedance mode at least during a measurement by the measurement module; a power supply configured to provide power to the measurement module; an energy storage coupled to the power supply; a measurement connection connecting the communication module to the energy storage, wherein the energy storage is arranged to be charged by the measurement connection and configured to provide power to the power supply for performing a measurement by the measurement module; and a switch arranged between the communication module and the energy storage, the switch being controllable to break the measurement connection between the communication module and the energy storage during a measurement by the measurement module.

19 Claims, 4 Drawing Sheets

(58) Field of Classification Search
USPC .................. 342/124, 175; 73/627; 713/320
See application file for complete search history.

(56) References Cited

U.S. PATENT DOCUMENTS

| | | | | |
|---|---|---|---|---|
| 7,498,974 | B2* | 3/2009 | Nilsson | G01S 13/88 |
| | | | | 73/290 R |
| 7,821,444 | B2* | 10/2010 | Hall | G01S 13/88 |
| | | | | 342/124 |
| 9,229,102 | B1* | 1/2016 | Wright | G01S 13/885 |
| 10,613,615 | B2* | 4/2020 | Niikura | H02J 7/0068 |
| 10,935,634 | B2* | 3/2021 | Vermeulen | G01S 7/4065 |
| 10,948,332 | B2* | 3/2021 | Kleman | G01S 13/343 |
| 2004/0257043 | A1* | 12/2004 | Takaoka | H02J 7/00302 |
| | | | | 320/132 |
| 2005/0168379 | A1 | 8/2005 | Griessbaum et al. | |
| 2008/0074309 | A1* | 3/2008 | Nilsson | G01S 13/88 |
| | | | | 342/124 |
| 2009/0322593 | A1* | 12/2009 | Hall | G01S 13/87 |
| | | | | 342/124 |
| 2013/0249446 | A1* | 9/2013 | Kumagai | H01M 10/44 |
| | | | | 320/167 |
| 2014/0107856 | A1 | 4/2014 | Haynes | |
| 2014/0333144 | A1* | 11/2014 | Ikeuchi | H02J 50/90 |
| | | | | 307/104 |
| 2017/0167911 | A1* | 6/2017 | Fehrenbach | G01S 13/08 |
| 2018/0136028 | A1* | 5/2018 | Kleman | G01S 7/35 |
| 2018/0136712 | A1* | 5/2018 | Niikura | H02J 7/0068 |
| 2018/0209833 | A1 | 7/2018 | Haynes et al. | |
| 2018/0238729 | A1* | 8/2018 | Haddy | G01F 23/30 |
| 2019/0369209 | A1* | 12/2019 | Vermeulen | G01S 7/40 |

* cited by examiner

RADAR LEVEL GAUGE SYSTEM AND METHOD FOR CONTROLLING THE RADAR LEVEL GAUGE SYSTEM

CROSS-REFERENCE TO RELATED APPLICATION

This Application is a Section 371 National Stage Application of International Application No. PCT/EP2019/060531, filed Apr. 24, 2019 and published as WO 2020/216443 on Oct. 29, 2020, in English, the contents of which are hereby incorporated by reference in their entirety.

FIELD OF THE INVENTION

The present invention relates to a system and a method for improved electromagnetic immunity of a radar level gauge.

BACKGROUND OF THE INVENTION

Field devices are often used in the industry to measure various process variables, such as pressure, temperature, flow or product level. In particular, a radar level gauge system may be used for measuring the level of a product such as a process fluid, a granular compound or another material.

In a radar level gauge system, an electromagnetic transmit signal may be propagated from a transceiver arranged at the top of a tank towards a surface of a product in the tank, and an electromagnetic reflection signal, resulting from reflection of the transmit signal at the surface, returns to the transceiver. Based on the transmit signal and the reflection signal, the distance to the surface of the product can be determined, from which the level of the product in the tank can be deduced.

In many facilities, such as process industrial facilities, where field devices are used, there is existing wiring between the field device and a remote location, such as a host. The existing wiring often forms a two-wire current loop for communication of commands from the host to the field device and a measurement signal indicative of a process variable from the field device to the host. Communication on the two-wire current loop may take place by controlling the current flowing through the loop. In a 4-20 mA loop, the measurement signal may, for example, be the loop current itself. As an alternative or complement to such an analog current level, digital information may be communicated by modulating the loop current, for example using the HART-protocol (Highway Addressable Remote Transducer).

In addition to being able to receive and send signals over the two-wire current loop, the field device may need to be able to operate using electric power drawn from the two-wire current loop. In other words, the field device may be a loop-powered field device.

Radar level gauge systems are for example used in the petroleum industry and in other applications wherein the measurement circuitry must adhere to Ex (explosion protection) requirements which makes it hard to meet stipulated EMC (electromagnetic compatibility) levels.

The main problem to solve is typically the conducted immunity as radiated immunity may be handled by imposing a requirement for tanks or vessels to be made of electromagnetic shielding materials (e.g. metal).

The conducted disturbances may for example be handled by adding filtering at the wired connection or by introducing a galvanic isolation of the most sensitive parts of the measuring circuit, which may then optionally be grounded to the vessel ground. The efficiency of the former method is typically limited due to the Ex requirements since the allowed levels of energy storing components (i.e. capacitance/inductance) are severely restricted. This is especially true at the relatively high voltage level applicable at the transmitters supply terminals i.e. the amount of filtering possible to achieve may simply not be sufficient. The latter method adds significant cost and/or complexity to the system.

SUMMARY

In view of above-mentioned and other drawbacks of the prior art, it is an object of the present invention to provide a radar level gauge system addressing issues related to conducted disturbances.

According to a first aspect of the invention, there is provided a radar level gauge system comprising: a communication module configured to be connected to an external communication device, a measurement module configured to generate, transmit and receive a measurement signal; a control connection configured to connect the communication module to the measurement module, the control connection being configured to be in a high-impedance mode at least during a measurement by the measurement module; a power supply configured to provide power to the measurement module, an energy storage coupled to the power supply; a measurement connection connecting the communication module to the energy storage. The energy storage is arranged to be charged by the measurement connection and configured to provide power to the power supply for performing a measurement by the measurement module.

The system further comprises a switch arranged between the communication module and the energy storage, the switch being controllable to break the measurement connection between the communication module and the energy storage during a measurement by the measurement module.

The present invention is based on the realization that a radar level gauge which is able to handle stipulated EMC levels can be achieved by arranging an internal energy storage which is controlled by a switch such that the external measurement connection can be disconnected during a measurement. Since the measurement connection is used to provide power to the energy storage, the measurement connection is a low-impedance connection to avoid power losses. By breaking the measurement connection between the communication module and the energy storage during a measurement, conduced disturbances are prevented from reaching the measurement module during a measurement.

Moreover, that the control connection, which is separate from the measurement connection, is in a high-impedance mode at least during a measurement by the measurement module should be interpreted to mean that the impedance of the connection between the communication module and the measurement module is sufficiently high to prevent conducted disturbances from reaching the measurement module, at least to the extent that a measurement is not negatively influenced by any disturbances reaching the measurement module via the control connection or via the measurement connection.

The described radar level gauge can provide advantageous EMC-properties at a low cost and complexity compared to solutions comprising e.g. conventional galvanic isolation using transformers and the like.

According to one embodiment of the invention, the measurement connection is advantageously a connection having an impedance which is adapted for providing power from the communication module to the energy storage. The measurement connection is a connection between the communication module and the measurement module which is also used to provide power to the energy storage, and subsequently to the measurement module. In order to charge the energy storage via the measurement connection, it is important that the impedance of the measurement connection is not too high as a high impedance would incur power losses in the connection when transferring energy from the communication module to the energy storage. A suitable impedance for the measurement connection as seen from the input side of the communication module may preferably be below some hundreds of ohms, such as below 3000. Moreover, the impedance between the output side of the communication module and the energy storage, through the switch, is preferably as low as possible. However, a suitable overall impedance of the measurement connection may also be based on the configuration of the measurement module.

The switch may also be provided in the form of a controlled current regulator, which in an on-state allows a current to pass up to a predetermined threshold current and which in an off-state exhibits a sufficiently high impedance for reducing disturbances.

According to one embodiment of the invention, the control connection may advantageously be configured to be controllable between a low-impedance mode and a high-impedance mode. Thereby, the control connection may for example be controlled to operate in a low-impedance mode during idle periods when no measurements are being performed and to operate in a high-impedance mode during measurements by the measurement module. The impedance of the control connection may for example be controlled by controlling the input impedance of the communication module, of the measurement module, or both. To control the impedance, the communication module, the measurement module, or both may be provided with a tri-state buffer or a general purpose I/O (GPIO) where the impedance of the input/output is controllable.

According to one embodiment of the invention the high-impedance mode of the control connection is preferably adapted to have an impedance which is sufficiently high for preventing conducted disturbances from propagating via the control connection to the measurement module. In particular, the high-impedance mode of the control connection is preferably adapted so that any disturbances conducted via the control connection and reaching the measurement module are suppressed to be sufficiently low so as to not negatively influence the measurement. The conducted disturbance is preferably lower than a useful echo signal of the radar level gauge for a given application. Moreover, the conducted disturbance is preferably lower than an inherent noise level of the measurement circuitry.

According to one embodiment of the invention, the impedance of the control connection in the high-impedance mode is preferably at least 10 times higher than an impedance of the control connection in a low-impedance mode. Thereby, conducted disturbances can be suppressed in the high-impedance mode.

According to one embodiment of the invention, the communication module is advantageously configured to control the control connection to operate in the high-impedance mode or in the low-impedance mode. Thereby, the impedance of the control connection can be coordinated with measurements by the measurement module. Moreover, the command to set the control connection in either mode can be received by the communication module form an external device. One advantage of being able to switch the control connection between high- and low-impedance modes is that a low-impedance mode allows for a higher bandwidth of e.g. a clock signal while the high-impedance mode provides the required protection from conducted disturbances.

According to one embodiment of the invention, the control connection is an optical connection. An advantage of using an optical connection is that it is immune to electrical disturbances, thereby preventing conducted disturbances from reaching the measurement module.

According to one embodiment of the invention, the switch may be further configured to be controlled by the measurement module to disconnect the communication module from the power supply during a measurement by the measurement module. By arranging the switch to be controlled by the measurement module, the switch can be controlled to be opened only when the measurement is being performed. Moreover, the switch can be controlled to be closed again directly once the measurement is completed, thereby maximizing the time that the switch is closed and thus the time for charging the energy storage.

According to one embodiment of the invention, the switch may be a semiconductor switch. The switch may also be electromechanical relay. There are advantages related to both types of switches and the type of switch to use may be based on various system parameters and requirements.

According to one embodiment of the invention, the system may further comprise a second switch arranged to break the control connection between the communication module and the measurement module. The second switch can then be controlled to be opened during a measurement so prevent conducted disturbances from reaching the measurement module. The switching functionality of the first and second switch may be provided by a single integrated switching unit.

According to one embodiment of the invention, wherein the measurement module is configured to be set in a low-power mode during charging of the energy storage. By minimizing the power consumption of the measurement module, the time for charging the energy storage can be minimized.

According to one embodiment of the invention, the communication module may advantageously be configured to be connected to a 4-20 mA current loop interface, for example using a HART communication protocol.

According a second aspect of the invention, there is provided a method for controlling a radar level gauge system comprising: a communication module configured to be connected to an external communication device; a measurement module configured to generate, transmit and receive a measurement signal; a control connection configured to connect the communication module to the measurement module, the control connection being configured to be in a high-impedance mode at least during a measurement by the measurement module; a power supply configured to provide power to the measurement module; an energy storage coupled to the power supply; a measurement connection connecting the communication module to the energy storage, wherein the energy storage is arranged and configured to be charged by the measurement connection and to provide power to the power supply for performing a measurement by the measurement module; and a switch arranged between the communication module and the energy storage. The method comprises: receiving, in the measurement module, a command to perform a measurement; controlling the switch to be in an open mode to break the measurement connection between the communication module and the energy storage;

performing a measurement by the measurement module; and controlling the switch to be in a closed mode to reconnect the measurement connection between the communication module and the energy storage.

By means of the described method, the described radar level gauge system can be controlled to perform a measurement with a significantly reduced risk of disturbances to the measurement.

Additional effects and features of the second aspect of the invention are largely analogous to those described above in connection with the first aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, an exemplary embodiment of the field device according to the present invention is discussed with reference to a guided wave radar level gauge system connected by a two-wire current loop connection. It should be noted that this by no means limits the scope of the present invention, which is equally applicable to other field devices, such as no-contact radar level gauge systems, temperature sensors, pressure sensors, etc. Moreover, the two-wire current loop may be configured to function according to various communication standards, such as 4-20 mA, HART, Foundation Fieldbus, Profibus etc.

Figure 1:
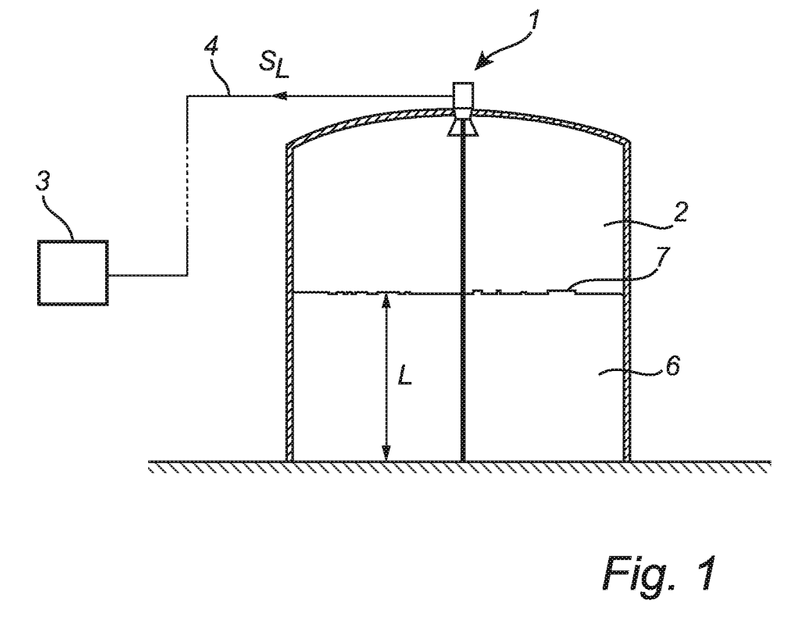
FIG. 1 schematically illustrates a field device, in the form of a radar level gauge installed in an exemplary tank.

FIG. 1 schematically illustrates a field device in the form of a radar level gauge 1 installed in an exemplary tank 2. The radar level gauge 1 is connected to a remote host/master 3 via a two-wire current loop 4, which is also used to provide power to the radar level gauge 1. The tank 2 contains a product 6, and when in operation, the radar level gauge 1 determines the filling level L of the product 6 in the tank 2 based on an electromagnetic transmit signal propagated towards the surface 7 of the product 6 and an electromagnetic reflection signal resulting from reflection of the transmit signal at the surface 7.

After having determined the filling level L, which is an example of a process variable, the radar level gauge provides a measurement signal $S_L$ indicative of the filling level L to the remote host/master 3 via the two-wire current loop 4. The radar level gauge and the procedure of performing a measurement by the radar level gauge will be described in more detail below with reference to FIG. 2 and FIG. 3.

Figure 2:
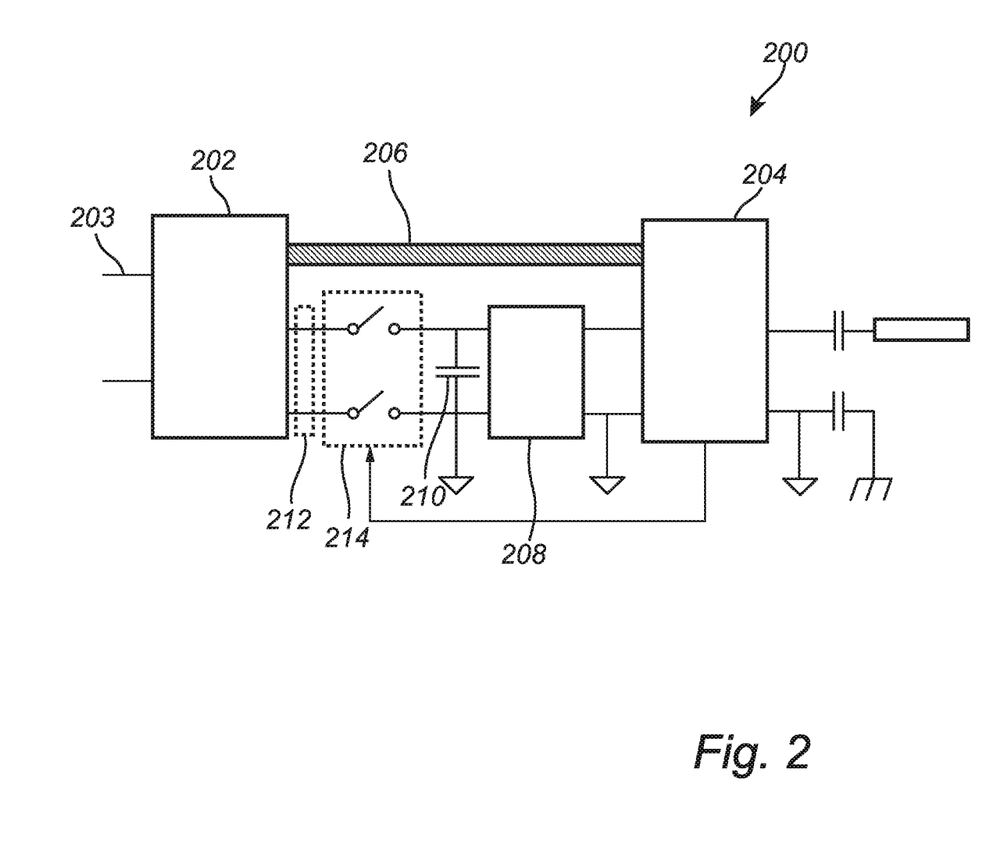
FIG. 2 is a block diagram schematically illustrating an exemplary embodiment of the field device according to the present invention, in the form of a radar level gauge system.

FIG. 2 is a block diagram schematically illustrating a radar level gauge system 200 according to an embodiment of the invention. The radar level gauge system 200 comprises a communication module 202 configured to be connected to an external communication device such as the remote host/master 3 illustrated in FIG. 1. The connection may be formed via a fieldbus interface 203 for connecting the radar level gauge system 200 to a two-wire 4-20 mA connection.

The radar level gauge system 200 further comprises a measurement module 204 configured to generate, transmit and receive a measurement signal, a control connection 206 configured to connect the communication module 202 to the measurement module 204, wherein the control connection is configured to be in a high-impedance mode at least during a measurement by the measurement module 204, a power supply 208 configured to provide power to the measurement module 204, an energy storage 210 coupled to the power supply 208, and a measurement connection 212 connecting the communication module 202 to the energy storage 210, wherein the energy storage 210 is arranged to be charged by the measurement connection 212 and configured to provide power to the power supply 208 for performing a measurement by the measurement module 204.

Moreover, the radar level gauge system 200 comprises a switch 214 arranged between the communication module 214 and the energy storage 210, the switch 214 being controllable to break the measurement connection 212 between the communication module 202 and the energy storage 210 during a measurement by the measurement module 204.

The control connection 206 and the measurement connection 212 here refer to physical wired connections facilitating the communicative coupling between the control module 202 and the measurement module 204.

Even though the energy storage 210 is here illustrated as a capacitor arranged between the switch 214 and the power supply 208, the energy storage 210 may also be arranged at different locations as long as the electrical coupling between the communication module 202 and the energy storage 210 can be broken by the switch 214. As illustrated in FIG. 2, the switch is a double switch 214 which breaks both conductors required for providing energy to the energy storage 210.

Moreover, the energy storage 210 may for example be an integrated part of the power supply 208. The energy storage 210 may also be provided in the form of a rechargeable battery.

Furthermore, both the energy storage 210 and/or the power supply 208 may be integrated in the measurement module 204 along with the required measurement circuitry. The energy storage 210, power supply 208 and measurement module 204 are shown as individual components for illustrative purposes. The power supply 208 may for example be a linear regulator or a DC/DC converter arranged on the same circuit board as the measurement circuitry.

The measurement connection 112 is adapted so that power losses in the connection are low, thereby facilitating efficient charging of the power storage 210. However, for some applications and in particular in explosion sensitive environments it may be desirable to adapt the resistance of the communication module 202 in order to provide suitable current and voltage levels to the measurement connection 112. The resistance of the measurement connection 112 between the communication module 202 and the energy storage 210 should be as low as possible and may preferably be below 100Ω.

The control connection 206 can be configured to be controllable between a low-impedance mode and a high-impedance mode. In a high-impedance mode the control connection 206 preferably has an impedance higher than 10 kΩ and in a low-impedance mode the control connection 206 preferably has an impedance lower than 100Ω. There is preferably a difference in impedance of at least ten times between the low- and high-impedance modes.

Figure 3:
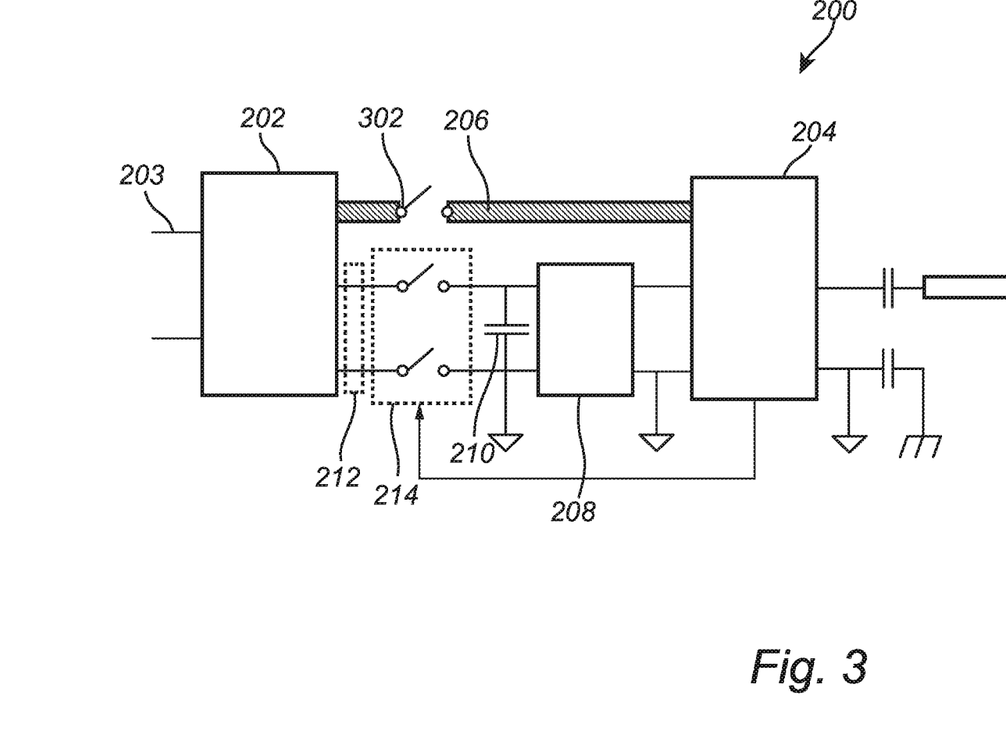
FIG. 3 is a block diagram schematically illustrating an exemplary embodiment the radar level gauge system.

FIG. 3 is a block diagram schematically illustrating a radar level gauge system 200 further comprising a second switch 302 arranged to break the control connection 206 between the communication module 202 and the measurement module 204. By controlling the switch 302, the control connection can be set in a low-impedance mode (switch closed) or in a high-impedance mode (switch open). Even though the switch 302 of FIG. 3 is illustrated as a physical switch, the functionality of switching between high and low-impedance modes may be provided in the communication module 202 and/or in the measurement module 204 by e.g. a tri-state buffer or a general purpose I/O (GPIO) interface.

Figure 4:
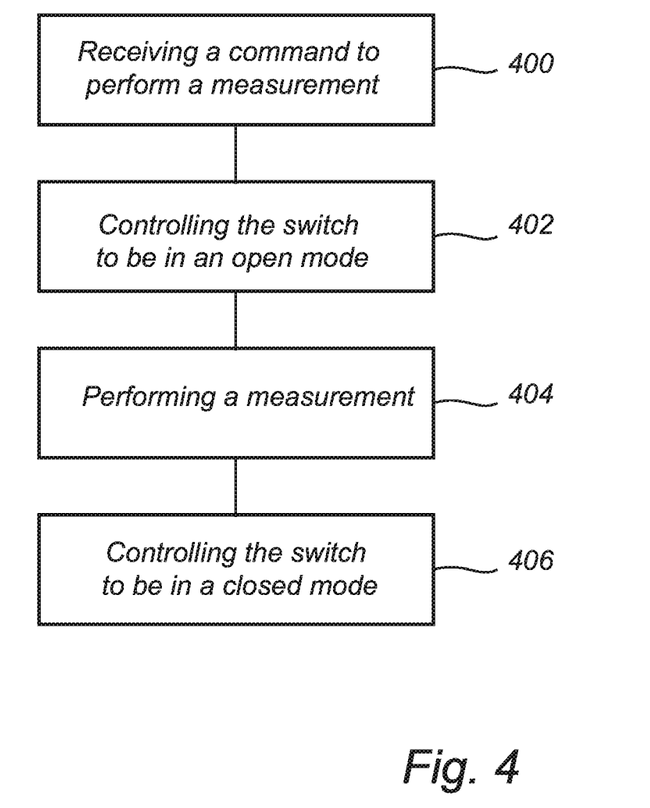
FIG. 4 is a flow chart outlining steps of a method for controlling a radar level gauge system according to an embodiment of the invention.

FIG. 4 is a flow chart outlining steps of a method for controlling the radar level gauge system, of FIGS. 2 and 3 according to embodiments of the invention. The method comprises: receiving 400, in the measurement module 202, a command to perform a measurement; controlling 402 the switch 214 to be in an open mode to break the measurement connection 212 between the communication module 202 and the power supply 210; performing 404 a measurement by the measurement module 204; and controlling 406 the switch 214 to be in a closed mode to reconnect the measurement connection 212 between the communication module 202 and the energy storage 210.

The command to perform a measurement may for example be sent by the communication module 202 to the measurement module 204, either based on a set frequency for measuring intermittently or based on a request from the remote host 3. That the measurement module 204 receives a command to perform a measurement may also encompass embodiments where measurements a are performed intermittently based on a predetermined frequency, or where a measurement is performed as soon as the energy storage is full. In such embodiments, the command may thereby be seen as a trigger for initiating a measurement.

An example measurement sequence may include that the communication module 202 issues a command to turn on the power of the measurement module 204, which preferably is deactivated or in a low-power mode when no measurement is performed in order to reduce the overall energy consumption of the radar level gauge system 200. Once a measurement is completed, the measurement module 204 may report back to the communication module 202. The switch 214 can thereby be controlled either by the measurement module or by the communication module such that the switch is closed when a measurement is completed and when the energy storage needs to be recharged.

The sequence of the steps of the method may however be modified. The step of controlling 402 the switch to be in an open mode may for example be performed before the measurement module receives 400 a command for performing a measurement.

In the embodiment illustrated in FIG. 3 comprising a second switch 302 braking the control connection 206 between the communication module 202 and the measurement module 204, the second switch 302 may be controlled by the measurement module 204. It is also possible to control the second switch 302 based on an estimated or known time for performing the measurement so that the communication module 202 can control the second switch 302 to be closed when the predetermined time has elapsed.

According an example embodiment, the measurement module 204 may monitor the status of the energy storage 210 and control the switch 214 based on a state-of-charge of the energy storage 210. Thereby, the switch can be closed when it is determined that the energy storage 210 needs to be recharged. The switch 214 may for example be controlled to be closed if the state-of charge of the energy storage 210 is below a predetermined threshold value. The switch 214 may also be controlled based on an estimated time required for fully charging the energy storage. In one embodiment, the switch may be controlled to remain closed for a time which is known to be sufficient for fully or sufficiently charging the energy storage based on known properties of the input signal received by the communication module 202. The time for charging the energy storage can also be determined based on a known current and voltage provided from the communication module 202 to the energy storage, or based on one known quantity and a look-up table or predetermined equation for determining a property of the energy storage 210.

Even though the invention has been described with reference to specific exemplifying embodiments thereof, many different alterations, modifications and the like will become apparent for those skilled in the art. Also, it should be noted that parts of the system and method may be omitted, interchanged or arranged in various ways, the system and method yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

What is claimed is:

1. A radar level gauge system comprising:
   a communication module configured to be connected to an external communication device;
   a measurement module configured to generate, transmit and receive a measurement signal;
   a control connection configured to connect the communication module to the measurement module, the control connection being configured to be in a high-impedance mode at least during a measurement by the measurement module;
   a power supply configured to provide power to the measurement module;
   an energy storage coupled to the power supply;
   a measurement connection connecting the communication module to the energy storage, wherein the energy storage is arranged to be charged by the measurement connection and configured to provide power to the power supply for performing a measurement by the measurement module; and
   a switch arranged between the communication module and the energy storage, the switch being controllable to break the measurement connection between the communication module and the energy storage during a measurement by the measurement module.

2. The system according to claim 1, wherein the measurement connection is a connection having an impedance which is adapted for providing power from the communication module to the energy storage.

3. The system according to claim 1, wherein the control connection is configured to be controllable between a low-impedance mode and a high-impedance mode.

4. The system according to claim 1, wherein the high-impedance mode of the control connection is adapted to have an impedance which is sufficiently high for preventing conducted disturbances from propagating via the control connection to the measurement module.

5. The system according to claim 3, wherein an impedance of the control connection in the high-impedance mode is at least 10 times higher than an impedance of the control connection in the low-impedance mode.

6. The system according to claim 3, wherein the communication module is configured to control the control connection to operate in a high-impedance mode or in a low-impedance mode.

7. The system according to claim 1, wherein the control connection is an optical connection.

8. The system according to claim 1, wherein the switch is further configured to be controlled by the measurement module to disconnect the communication module from the power supply during a measurement by the measurement module.

9. The system according to claim 1, wherein the switch is a semiconductor switch.

10. The system according to claim 1, wherein the switch is an electromechanical relay.

11. The system according to claim 1, further comprising a second switch arranged to break the control connection between the communication module and the measurement module.

12. The system according to claim 1, wherein the measurement module is configured to be set in a low-power mode during charging of the energy storage.

13. The system according to claim 1, wherein the communication module is configured to be connected to a 4-20 mA current loop interface.

14. Method for controlling a radar level gauge system comprising:
a communication module configured to be connected to an external communication device;
a measurement module configured to generate, transmit and receive a measurement signal;
a control connection configured to connect the communication module to the measurement module, the control connection being configured to be in a high-impedance mode at least during a measurement by the measurement module;
a power supply configured to provide power to the measurement module;
an energy storage coupled to the power supply;
a measurement connection connecting the communication module to the energy storage, wherein the energy storage is arranged and configured to be charged by the measurement connection and to provide power to the power supply for performing a measurement by the measurement module; and
a switch arranged between the communication module and the energy storage;
wherein the method comprises:
receiving, in the measurement module, a command to perform a measurement;
controlling the switch to be in an open mode to break the measurement connection between the communication module and the energy storage;
performing a measurement by the measurement module; and
controlling the switch to be in a closed mode to reconnect the measurement connection between the communication module and the energy storage.

15. The method according to claim 14, wherein the switch is controlled by the measurement module.

16. The method according to claim 14, further comprising controlling the control connection to be in a low-impedance mode when the switch is in the closed mode and to be in a high-impedance mode when the switch is in the open mode.

17. The method according to claim 14, further comprising, by the measurement module, monitoring the status of the energy storage and controlling the switch based on a state-of-charge of the energy storage.

18. The method according to claim 14, further comprising controlling the switch based on an estimated time required for fully charging the energy storage.

19. The method according to claim 14, further comprising controlling the measurement module to operate in a low-power mode during charging of the energy storage.

* * * * *